Nov. 25, 1969
G. SOTEROPULOS
3,480,164
TRACTOR-MOUNTED BALE THROWER
Filed May 16, 1968
2 Sheets-Sheet 1
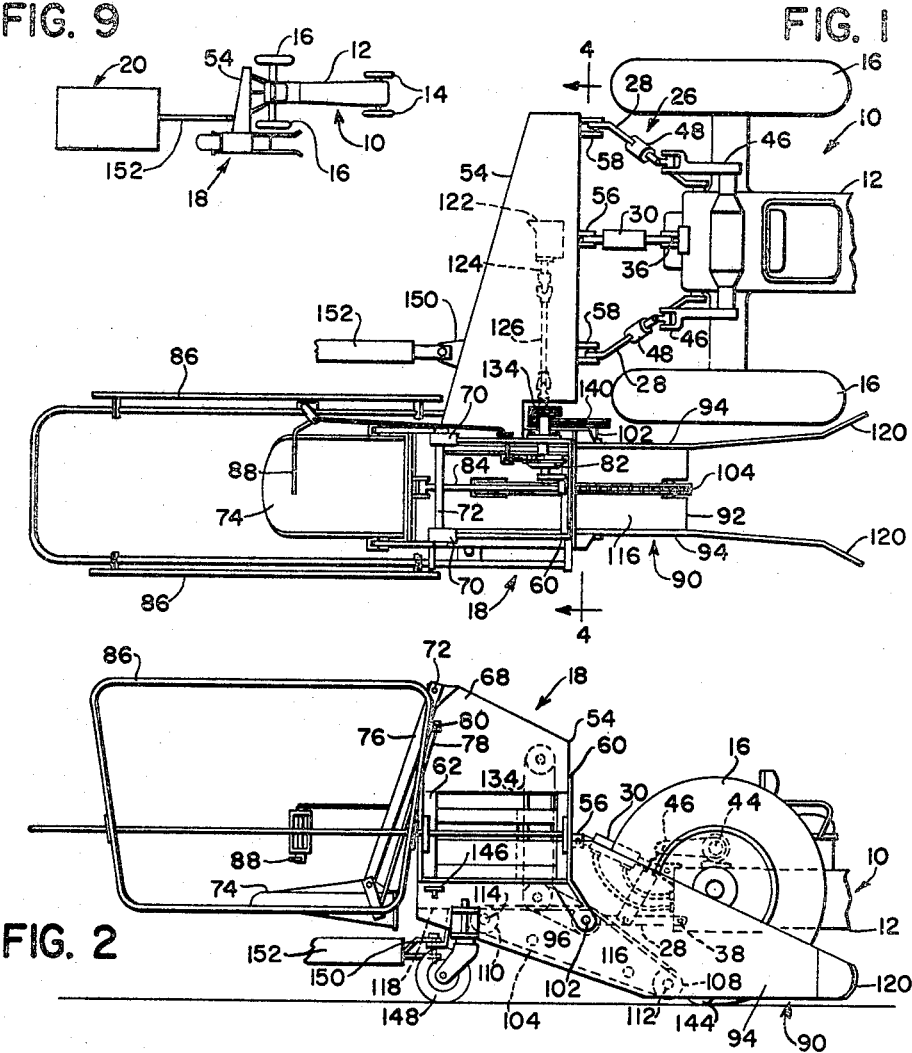
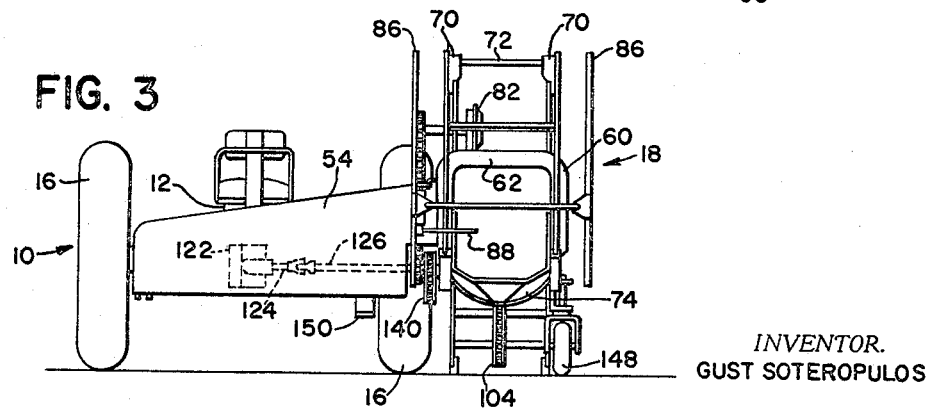
INVENTOR.
GUST SOTEROPULOS

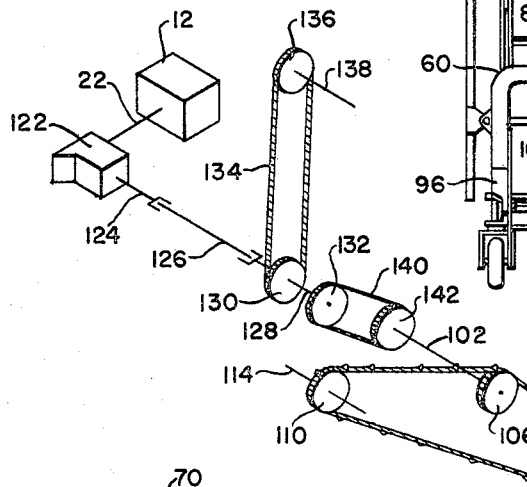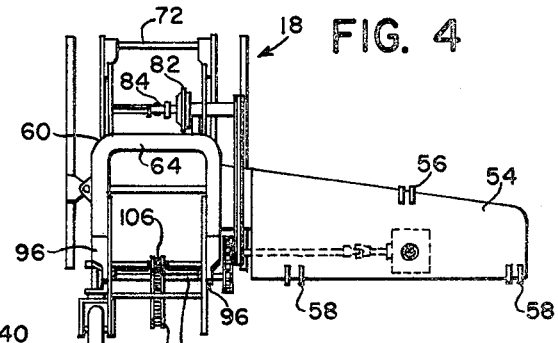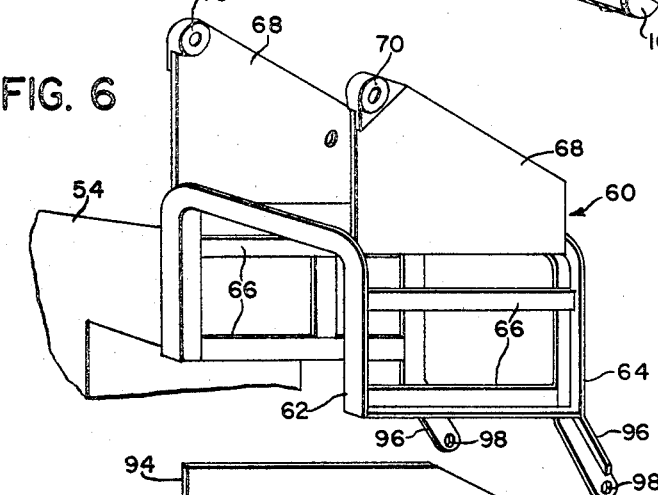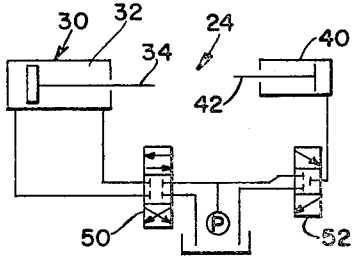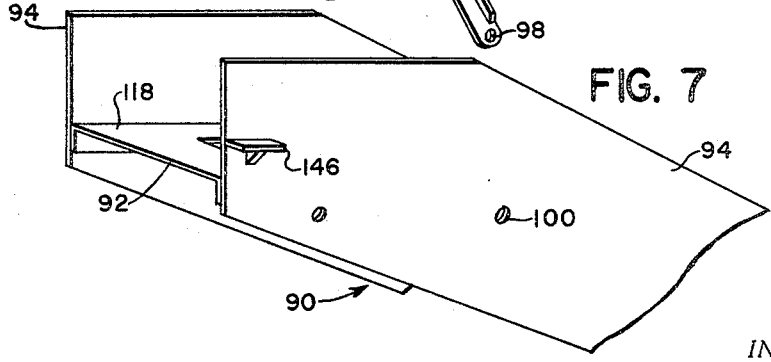

United States Patent Office 3,480,164
Patented Nov. 25, 1969

3,480,164
TRACTOR-MOUNTED BALE THROWER
Gust Soteropulos, Ottumwa, Iowa, assignor to Deere & Company, Moline, Ill., a corporation of Delaware
Filed May 16, 1968, Ser. No. 729,741
Int. Cl. B65g 65/02, 67/24
U.S. Cl. 214—42                              10 Claims

ABSTRACT OF THE DISCLOSURE

A bale thrower mounted on a tractor, entirely apart from a baler, and used for picking up successive bales directly from the field and throwing or ejecting them into a trailing wagon.

BACKGROUND OF THE INVENTION

This invention relates to bale-handling equipment, especially to machines for throwing bales into a trailing vehicle accompanying the vehicle that carries the throwing mechanism.

The first commercially successful bale thrower was balermounted (e.g., U.S. patent to Charles S. Morrison and Murray W. Forth 2,756,865 dated July 31, 1956) and this pattern became established and followed through successive improvements over the past decade (e.g. U.S. Patent to Harold E. deBuhr and Bobby G. Sawyer 3,115,976 dated Dec. 31, 1963 and corresponding Canadian Patent 697,767, dated Nov. 10, 1964, and U.S. Patent to Harold E. deBuhr 3,155,223, dated Nov. 3, 1964 and corresponding Canadian patent 727,393, dated Feb. 8, 1966). The Morrison patent features a thrower in which the bale, emerging from the bale case of the baler, is gripped between a pair of baler-supported swingable arms, and the deBuhr design substitutes a swingable pan for carrying and throwing the bale. Still other constructions use rollers or belts and the like as the throwing means. All these designs have in common, however, the mounting of the thrower directly on and as a rather permanent part of the baler to function as part of an overall automatic baling "system."

One characteristic of that system is that in a typical operation the trailing wagon, when loaded, must be disconnected from the baler and hooked up to another tractor to be towed away to where the bales are to be stored, and another wagon is connected to the baler and so on, so that the baling and loading operation can be performed substantially continuously. This of course requires at least two wagons, two tractors and two drivers unless the baling operation is to be interrupted while the baler tractor is used to tow the loaded wagon, which is quite impracticable. In large scale hay growing, the use of several wagons, tractors etc., is justified but for smaler-scale operations the fully automatic system has certain disadvantages, as will be seen from above, mainly because of the need for several wagons, tractors and drivers.

SUMMARY OF THE INVENTION

The present invention provides a machine that lends itself to what may be termed a one-man operation, because one man may use one tractor to pull the baler, allowing the bales to be discharged directly to the ground. In this case, no stops need be made to connect and disconnect wagons and tractors and an entire field may be baled, leaving the bales to be picked up later, which is accomplished by use of the tractor-mounted thrower, ahead of and included in which is means for picking up individual bales from the ground and delivering each such bale to thrower means which in turn throws the bales successively to the trailing wagon. When the wagon is full, the operator, working by himself, simply drives the thrower-equipped tractor and trailer to the unloading or storage location and, after unloading, returns to the field. Another advantage of this arrangement is that the operator, when previously baling without including the bale-throwing phase, can bale much faster and thus may finish baling an entire field while the weather is suitable, because bailing by itself is faster than baling plus loading.

The tractor-mounted thrower also has advantages over the old-fashioned elevator-type pickups used in a similar environment, since these prior machines are cumbersome, are primarily drawn machines, are slow in operation and are difficult to power and control from the tractor.

BRIEF DESCRIPTION OF THE DRAWINGS

FIG. 1 is a plan of a tractor-mounted thrower, the forepart of the tractor being omitted;
FIG. 2 is a side elevation;
FIG. 3 is a rear elevation;
FIG. 4 is a section on the line 4—4 of FIG. 1;
FIG. 5 is a perspective schematic of the drive;
FIG. 6 is an enlarged perspective of part of the support structure;
FIG. 7 is an enlarged perspective of part of the pick-up means;
FIG. 8 is a schematic of the tractor hydraulic system; and
FIG. 9 is a reduced-scale plan of the tractor-thrower-trailer train.

DESCRIPTION OF A PREFERRED EMBODIMENT

A typical agricultural tractor 10, having a fore-and-aft body 12 carried by a pair of front wheels 14 and a pair of rear traction wheels 16, is the basic vehicle for carrying a bale thrower 18 which operates to throw bales to a trailing wagon 20 or equivalent bale-receiving receptacle. This arrangement, as already explained, is operated entirely apart from any structural connection with a baler. In other words, the baling operation has been completed and bales will be lying at intervals in the field, as is well known.

The tractor has a rear power take-off 22 (FIG. 5), a hydraulic power lift system 24 (FIG. 8), and typical hitch means, here a linkage 26 of the so-called three-point type. This linkage includes a pair of lower, trailing or draft links 28 and a top link 30, here a two-way fluid motor comprising a cylinder 32 and piston and rod 34. These links are pivotally connected to the tractor, as at 36 and 38 as is customary, for selective vertical adjustment by the power lift system, here typically including a one-way cylinder 40 carried by the tractor body and having a piston rod 42 connected (not shown) to a transverse rockshaft 44 equipped with lift arms 46 which are in turn connected by lift links 48 to the lower draft links 28. As seen in FIG. 8, the power lift system may include a pump P, a valve 50 for the top link cylinder 30 and a valve 52 for the rockshaft cylinder 40. The remainder of the hydraulic circuits and operation of the valves will be clear without further description, since these are familiar to those versed in the art as known equipment on most farm tractors. Also, such tractor will include the usual operator convenient control levers, not shown, all of which are exploited to the advantage of the mounted thrower.

The bale handling mechanism includes a structural support 54 of fabricated steel, for example, having one upper hitch point 56 and two lower hitch points 58 for pivotal attachment respectively to the rear end of the top link 30 and to the rear ends of the draft links 28. The support is of course of rigid construction and is supported entirely on the linkage 26 and will therefore raise and lower with the linkage under control of the rockshaft cylinder 40. Also, the top link 30, being a hydraulic ram, may be extended and retracted to pivot the support 54 about the transverse axis established by the pivotal connections at 58, 58 to the draft links 28.

The support 54 is essentially elongated transversely of the fore-and-aft center line of the tractor and at its right-hand end is extended as, or has rigidly affixed thereto, a carrier 60, here made up of a pair of longitudinally spaced apart inverted U-shaped members 62 and 64, appropriate brace members 66 and a pair of transversely spaced, rigid upright plates 68, the upper rear corners of which are provided with bearings 70 for carrying a transverse pivot shaft 72. The carrier 60 is laterally offset outwardly of the right-hand rear wheel 16 of the tractor.

The bale thrower 18 is here shown as being of the deBuhr type, having a bale pan 74 carried at the lower ends of two pairs of main links 76 and parallel control links 78. The upper ends of the two main links 76 are connected to the cross shaft 72 and the two control links 78 are pivoted at their upper ends 80 to the plates 68. The drive means for activating and deactivating the thrower may be of the Morrison and deBuhr type and includes a self-interrupting one-revolution clutch 82, the crank of which is connected by a pitman 84 to the pan 74 so that with each revolution of the clutch the pan 74 swings upwardly and rearwardly to throw a bale and then returns to its starting or receiving position to await another bale. These are details that are all explained in the above patents. The throwing mechanism is flanked at each side by safety screens 86 and supports therefor, and one of these carries a trip arm 88 for tripping the clutch 82, again as explained in the above patents. As previously pointed out, the bale thrower could be of any type and that shown and described here is merely by way of illustration.

Bales from the field reach the pan via pickup means 90, here a trough-like structure having a slotted floor 92 and side sheets 94, carried by the carrier 60. As best seen in FIGS. 6 and 7, the front inverted U 64 of the carrier has its legs extended downwardly and somewhat forwardly at 96 and these are apertured in transverse alinement at 98. The side sheets 94 are also apertured in alinement at 100 (only one is shown) and these four alined apertures receive a cross shaft 102 which serves not only as a pivot for articulately connecting the pickup 90 to the carrier 60 but also as an input shaft for a lugged pickup chain 104 that is trained about a sprocket 106 on the shaft 102 and about sprockets 108 and 110 on front and rear shafts 112 and 114 respectively. The slotted floor accommodates the chain and its lugs. As will be apparent, the forward part of the floor 92 at 116, as well as the complementary part of the chain 104, slopes downwardly and forwardly into proximity to the ground so as to improve the bale pickup function, and the rear part of the floor at 118 is substantially at the level of and leads to the pan 74. The side sheets 94 have forwardly diverging extensions 120 to cause the field-borne bales to enter onto the conveyor or chain 104 for conveyance to the rear and ultimately to the pan 74. The bale that is supported by the rear floor part 118 is pushed onto the pan by the next succeeding bale that is moved rearwardly on the pickup 90 and ultimately engages and moves the arm 88 to trip the clutch 82 for activating and deactivating the thrower 18.

The drive to the clutch 82 and to the pickup input shaft 102 derives from the tractor power take-off 22. See FIG. 5. The support 54 carries a gear box 122 containing gearing (not shown) driven by the power take-off shaft 22, and this gearing drives a transverse output shaft 124 which is connected by a propeller shaft 126, and appropriate universal joints, to a counter shaft 128 to which are keyed a pair of sprockets 130 and 132, the former of which is connected by a chain 134 to a sprocket 136 on an input shaft 138 for the clutch 82. The manner in which the clutch is intermittently connected to and disconnected from the constantly rotating input shaft 138 will be clear from the above-mentioned patents. The other sprocket 132 on the shaft 128 is connected by a chain 140 to a sprocket 142 keyed to the pickup input shaft 102.

As described above, the shaft 102 serves also as a transverse pivotal connection between the pickup 90 and the basic supporting structure 54–60. This enables the pickup, equipped with a ground-engaging skid 144, to follow ground contour without affecting the basic support. This pivot at 102, which is coaxial, or substantially so, with the pivot axis at 58—58 between the lower links 28 and the support 54, also enables the support, carrier and thrower 18 to be rocked about the axis 58—58 by extension and retraction of the hydraulic top link 30 without affecting the pickup. It will be seen that such rocking of the aforesaid structure will change the attitude of the pan 74 etc. relative to the ground and also relative to the wagon 20 and therefore will effect changes in the trajectory of thrown bales, thus facilitating distribution of the bales throughout the length of the wagon. Small changes in the attitude of the thrower 18 by means of the link 30 will accomplish the necessary changes in bale trajectory.

Because of the pivot at the shaft 102, the pickup 90 will tend to rock forwardly and downwardly as the hitch linkage 26 is raised to transport by the rockshaft cylinder 40. In order to assure that the pickup 90 is ultimately raised clear of the ground and also to transport position, lost-motion stop means has been provided. One form of such means is shown as including a lug 146 at a rear part of the pickup. This lug, during normal operation, is spaced somewhat below the proximate carrier brace member 66 so as to allow "floating" action of the pickup. However, when the hitch linkage, together with the support 54 etc., is fully raised, the lug 146 will have engaged the member 66 from below to stop clockwise rocking of the pickup.

The rear of the pickup may be supported by a ground-engaging means, such as a caster wheel 148, which is additional to the support afforded by the tractor. Since the cross shaft 102 is intermediate the pickup skid 144 and the caster wheel 148, support is also given to the overall structure.

A hitch 150 is provided at a lower rear part of the support 54 for a typical towing connection to a tongue 152 on the wagon 20.

The basic design disclosed here reveals the adaptability of any type of bale thrower or ejector to the mounting thereof on a tractor, resulting in a low-cost, one-man-operable machine that is easily mountable on and dismountable from the tractor and that is further drivable from and controllable by typical tractor components already present as parts of the tractor.

I claim:

1. For use with an agricultural tractor having a fore-and-aft body carried by front and rear wheels at each side thereof and equipped with a power take-off, a power lift system and rear-mounted three-point hitch linkage vertically adjustable by the power lift system: bale handling mechanism adapted for mounting on the tractor, comprising a support connectible to and carried by the hitch linkage and including a laterally offset carrier portion projecting laterally beyond the tractor rear wheel at one side of the tractor body, means for towing a bale-receiving receptacle in trailing relation to the tractor and support, bale thrower means carried by the carrier portion, bale pickup means carried by the carrier portion and projecting forwardly therefrom alongside said tractor rear wheel and adapted to pickup individual bales from the field and to deliver each such bale successively to the bale thrower means, and means drivingly interconnecting the power take-off to the thrower means ot activate the latter to throw successive bales upwardly and rearwardly to the receptacle.

2. The invention defined in claim 1, including an additional ground-engaging support sustaining the bale-handling mechanism.

3. The invention defined in claim 1, in which the hitch linkage includes a pair of lower links to which the support is pivotally connected on a transverse axis and an upper fore-and-aft adjustable link operated by the power lift system for adjusting the support about the aforesaid axis.

4. The invention defined in claim 3, in which the pickup means is articulately connected to the carrier for enabling relative movement between the carrier and pickup means as the carrier and support are adjusted as aforesaid.

5. The invention defined in claim 4, in which cooperative lost-motion parts are provided on the carrier and pickup means and operative to interengage when the support is raised via raising of the hitch linkage by means of the power lift system whereby the pickup means is also raised.

6. For use with an agricultural tractor having a fore-and-aft body carried by front and rear wheels at each side thereof and equipped with a power take-off, a power lift system and rear-mounted hitch means: bale handling mechanism adapted for mounting on the tractor, comprising a support connectible to and carried by the hitch means and including a laterally offset carrier portion projecting laterally beyond the tractor rear wheel at one side of the tractor body, means for towing a bale-receiving receptacle in trailing relation to the tractor and support, bale thrower means carried by the carrier portion, bale pickup means carried by the carrier portion and projecting forwardly therefrom laterally outwardly of said tractor rear wheel and adapted to pickup individual bales from the field and to deliver each such bale successively to the bale thrower means, and means for driving the thrower means to throw successive bales upwardly and rearwardly to the receptacle.

7. The invention defined in claim 6, including means powered by the tractor power lift system for adjusting the position of the bale handling means relative to the tractor.

8. The invention defined in claim 6, including means for driving the thrower means from the power take-off.

9. For use with an agricultural tractor having a fore-and-aft body: bale handling mechanism comprising a support connectible to and carried by the tractor and including a laterally offset carrier portion projecting laterally beyond the one side of the tractor body, means for towing a bale-receiving receptacle in trailing relation to the tractor and support, bale thrower means carried by the carrier portion, bale pickup means carried by the carrier portion and projecting forwardly therefrom at said side of the tractor and adapted to pickup individual bales from the field and to deliver each such bale successively to the bale thrower means, and means for driving the thrower means to throw successive bales upwardly and rearwardly to the receptacle.

10. The invention defined in claim 1, in which the pickup means is articulately connected to the carrier to facilitate its following ground contour.

References Cited

UNITED STATES PATENTS 2,756,865    7/1956    Morrison et al.
3,115,976   12/1963    de Buhr et al.

ROBERT G. SHERIDAN, Primary Examiner

U.S. Cl. X.R.

198—7